United States Patent [19]

Sukeda et al.

[11] Patent Number: 4,894,816
[45] Date of Patent: Jan. 16, 1990

[54] OPTICAL INFORMATION RECORDING APPARATUS

[75] Inventors: Hirofumi Sukeda, Kokubunji; Masahiro Ojima, Tokyo; Atsushi Saito, Ichikawa, all of Japan

[73] Assignee: Hitachi, Ltd., Tokyo, Japan

[21] Appl. No.: 152,803

[22] Filed: Feb. 5, 1988

[30] Foreign Application Priority Data

Feb. 12, 1987 [JP] Japan ................................ 62-28248
Jun. 5, 1987 [JP] Japan ................................ 62-139723

[51] Int. Cl.[4] ................. G01D 15/14; G11B 21/10; G11B 7/00
[52] U.S. Cl. .................................. 369/54; 369/116; 369/124
[58] Field of Search ................ 369/54, 32, 124, 116

[56] References Cited

U.S. PATENT DOCUMENTS 4,646,103  2/1987  Sugiyama et al. ............... 369/44
4,648,085  3/1987  Shimonou ......................... 369/54
4,680,594  7/1987  Bracht ............................... 369/54

FOREIGN PATENT DOCUMENTS 58-177534  10/1983  Japan ............................. 369/116
58-182144  10/1983  Japan .
60-25032    2/1985  Japan .
60-87440    5/1985  Japan .
60-247827  12/1985  Japan .

Primary Examiner—Steven L. Stephan
Attorney, Agent, or Firm—Antonelli, Terry & Wands

[57] ABSTRACT

An optical information recording apparatus, in which marks having a desired shape are recorded at desired positions, independently of the patterns of recording pulses, while canceling influences of the heat conduction from the mark, which has been directly previously recorded, by controlling the energy at the front end portion of laser light pulses, depending on the interval from the directly preceding pulse, when recording medium is irradiated with the laser light pulses corresponding to recording pulses so as to record information.

15 Claims, 8 Drawing Sheets

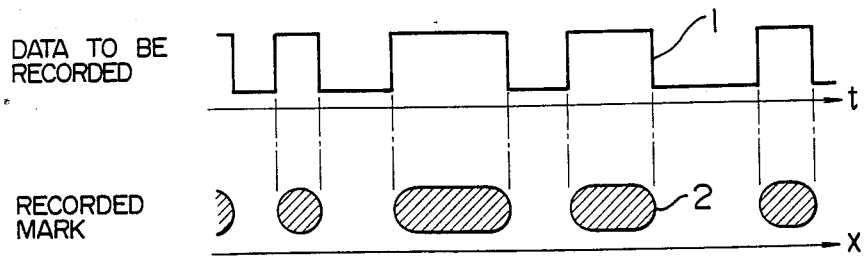
F I G. 1
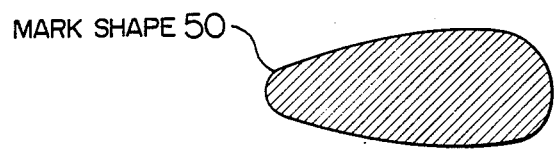
F I G. 2
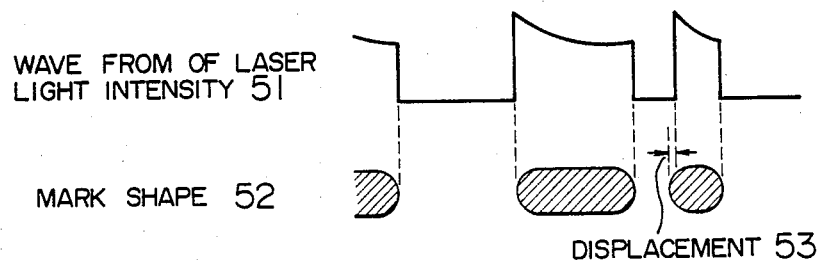
F I G. 3
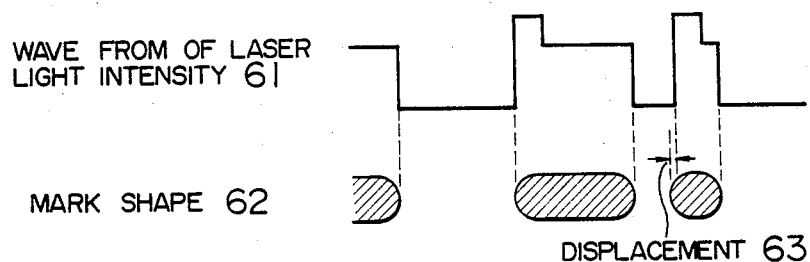
F I G. 4

OPTICAL INFORMATION RECORDING APPARATUS

BACKGROUND OF THE INVENTION

This invention relates to an optical information recording apparatus, such as an apparatus for an optical disc file, etc., recording information by irradiating a moving recording medium with focused laser light.

In an optical information recording apparatus, such as an optical disc device, etc., a laser light beam is used as recording means. This laser light beam is intensity-modulated, depending on data to be recorded and focused in an extremely small spot by means of an optical lens so that binary information is recorded by the fact that the heat energy thereof alters portions of recording medium irradiated with light so as to form recorded marks. FIG. 1 indicates the relation between data to be recorded (recording pulses) 1 and ideal recorded marks 2 formed on the recording medium, in which information is recorded as an example in the form of the mark length. In FIG. 1, since information contained in the data to be recorded (recording pulses) 1 corresponds to the boundary between the presence and the absence of the marks 2, it is important how precisely in the position the extremities of the marks are formed. By the prior art recording method using rectangular laser light pulses the marks have the shape of a tear drop 50, the front end portion of which is narrower than the rear end thereof, because of influences of the thermal conductivity of the recording medium, as indicated in FIG. 2.

As a method for correcting these phenomena there is known a method, by which information is recorded with laser light pulses, whose intensity is so regulated that it is higher at the front end than at the rear end thereof, as disclosed in Nos. JP-A-60-25032, JP-A-60-87440, JP-A-60-247827, JP-A-58-182144, and U.S. Pat. No. 4,646,103 (refer to the waveform of the laser light intensity 51 in FIG. 3 and the waveform of the laser light intensity 61 in FIG. 4).

However, when the recording density is increased and the interval between laser light pulses is shortened, the temperature of the recording medium is excessively increased at the front end portion of the laser light pulses because of the thermal conductivity from the directly preceding recorded mark, which gives rise to displacement 53 or 63 in the position of the leading edge of recorded marks, as indicated by the shapes of mark 52 and 62 in FIGS. 3 and 4, respectively. The amount of this displacement 53, 63 varies, depending on the interval between laser light pulses, the distance between two adjacent marks, etc., which gives rise to a drawback that jitter is produced at the recording/reproduction.

SUMMARY OF THE INVENTION

An object of this invention is to provide an optical information recording apparatus capable of controlling the position and the shape of recorded marks formed on recording medium with a high precision independently of the pattern of data to be recorded (recording pulses).

Furthermore this invention provides an optical information recording apparatus capable of controlling the position and the shape of recorded marks formed on recording medium with a high precision independently of the magnitude of the scanning speed with the laser light beam.

This invention is characterized in that the energy of the laser light pulse at the front end portion is controlled, depending on the interval from the directly preceding light pulse, when information is recorded by irradiating a recording medium with a laser light pulse corresponding to a pulse to be recorded, in order to cancel influences from the directly preceding recording mark.

According to a first feature of this invention the energy of the laser light pulse at the front end portion is controlled by varying the light intensity of the laser light pulse at the front end portion, with which the recording medium is irradiated, depending on the interval from the directly preceding light pulse.

According to another feature of this invention the power of the laser light pulse at the front end portion is controlled by varying the pulse width at the front end portion of the laser light pulse while controlling the starting timing of the irradiation with the laser light pulse.

According to still another feature of this invention the scanning speed of the recording medium with a laser light beam is detected and the intensity of the laser light when the recording medium is not irradiated with the laser light pulse is controlled, depending on the scanning speed, so that the temperature of the recording medium just before the irradiation with the laser light pulse is kept constant. Further the energy of the laser light pulse is controlled at the front and the rear end portions, depending on the scanning speed.

According to this invention it is possible to cancel influences of the heat conductivity from the directly preceding recorded mark, independently of the pattern of the pulse to be recorded, by controlling the energy of the laser light pulse at the front end portion, depending on the interval from the directly preceding laser light pulse and to record precisely the mark having a desired shape at a desired position. Furthermore, by controlling the intensity of the laser light when the recording medium is not irradiated with the laser light pulse, depending on the scanning speed, so that the temperature of the recording medium just before the irradiation with the laser light pulse is kept constant, setting of recording conditions depending on the scanning speed with the laser light beam is made easier and since the position and the shape of the recorded mark can be controlled with a high precision, it is possible to effect optical information recording with a higher density.

BRIEF DESCRIPTION OF THE DRAWINGS

FIG. 1 shows the relation between data to be recorded (recording pulses) and ideal recorded marks formed on recording medium;

FIG. 2 shows the shape of a mark recorded according to a prior art laser drive method;

FIG. 3 shows the waveform of the laser light intensity according to the prior art laser drive method and the shape of marks recorded by this method;

FIG. 4 shows the waveform of the laser light intensity according to another prior art laser drive method and the shape of marks recorded by this method;

DESCRIPTION OF THE PREFERRED EMBODIMENTS

Figure 5:
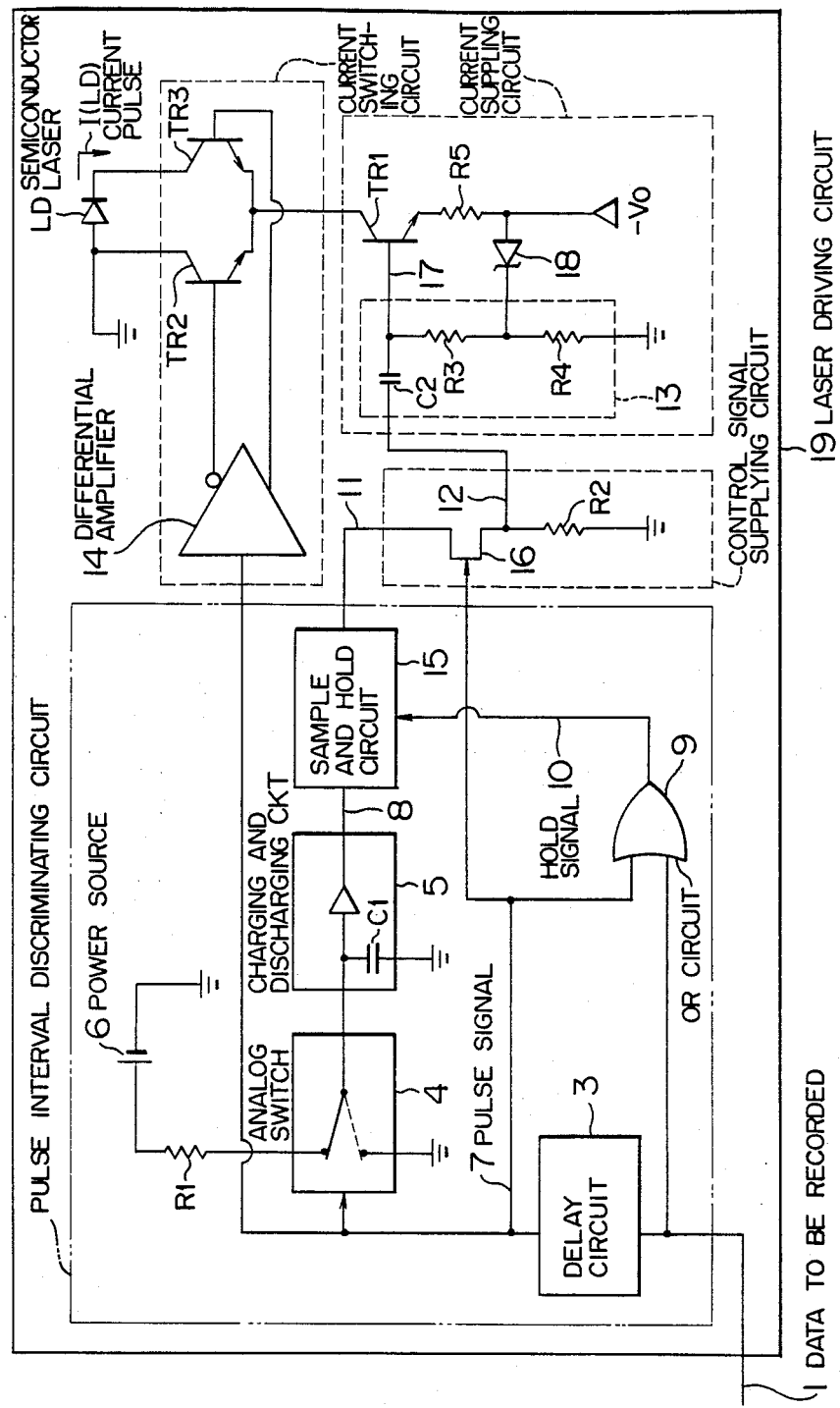
FIG. 5 is a scheme illustrating an embodiment of a laser driving circuit in an optical information recording apparatus according to this invention.
Figure 6:
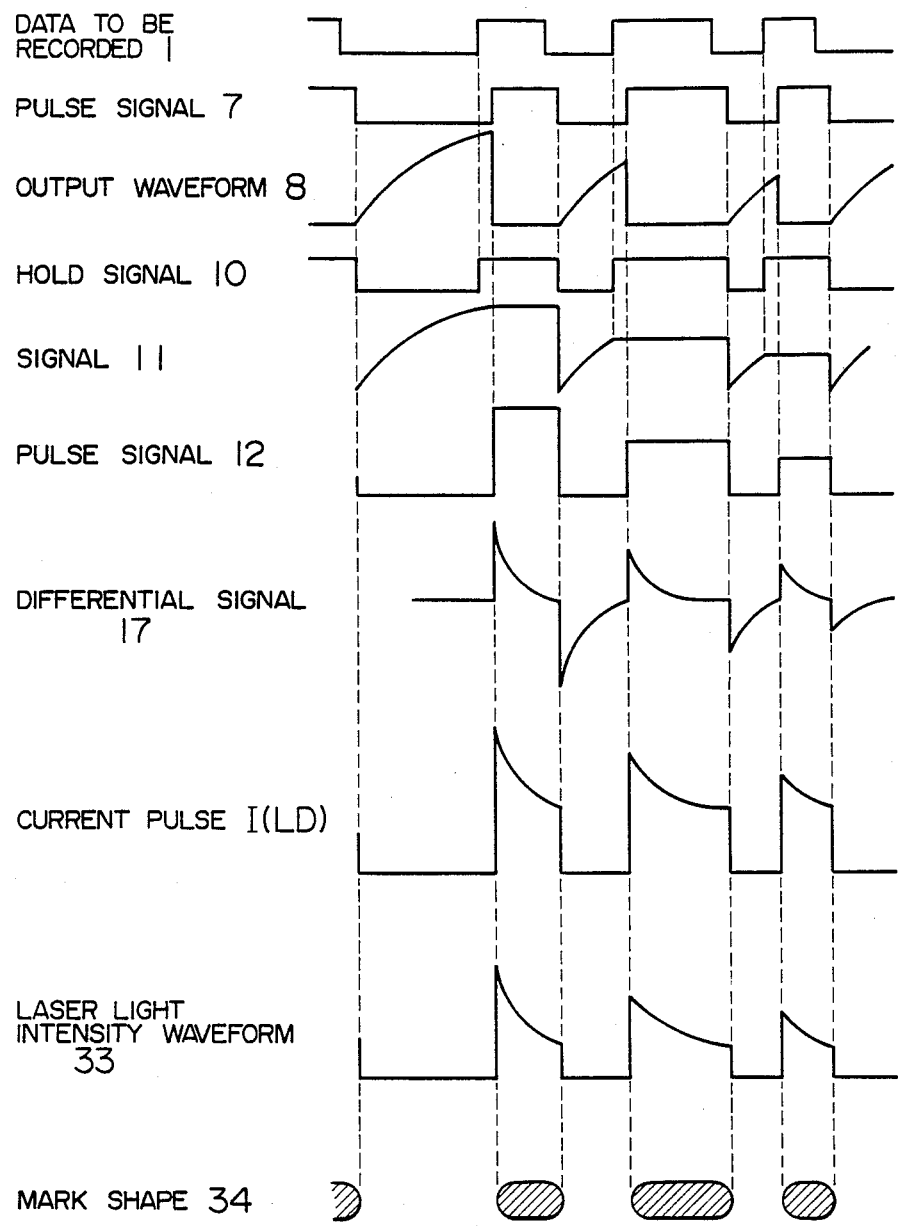
FIG. 6 shows the working waveform for the circuit of the embodiment.

FIG. 5 is a scheme illustrating an embodiment of this invention and FIG. 6 shows the waveform of signals at various parts of the apparatus indicated in FIG. 5. Data to be recorded or recording pulses 1 drive an analogue switch 4 after having passed through a delay circuit 3. The analogue switch 4 switches over a power source 6 (at the pulse off) through a resistor R 1 and the ground potential (at the pulse on) and connects the succeeding charging and discharging circuit 5 with one of them. FIG. 6 shows the relation between a pulse signal 7 inputted in the analogue switch 4 and the output waveform 8 of the charging and discharging circuit 5. The time constant related to variations in the voltage of the output waveform 8 of the charging and discharging circuit 5 is determined by the product of the capacitance of a capacitor C 1 and the resistance of the resistor R 1 and the attainable highest voltage thereof is limited by the voltage of the power source 6. Further a hold signal 10 is generated, starting from the data to be recorded 1, by means of a delay circuit 3 and an OR circuit 9. This hold signal 10 drives a sample and hold circuit 15 and a signal 11 indicating the pulse interval is obtained from the output waveform 8 of the charging and discharging circuit 5. By connecting this with the drain of an FET 16 and by switching it while applying a pulse signal 7 to its gate a pulse signal 12 determined by the interval of recording pulses is generated across a resistor R 2. This pulse signal 12 is applied to a transistor TR 1 through a differentiation circuit 13 consisting of a capacitor C 2 and resistors R 3 and R 4 and controls the magnitude of the recording current supplied to a semiconductor laser LD. A differential amplifier 14 supplies two differential signals having polarities opposite to each other to transistors TR 2 and TR 3, respectively, constituting a differential output device, responding to the pulse signal 7 inputted through the delay circuit 3. The collector of the transistor TR 1 is connected with the emitters of the transistors TR 2 and TR 3. Driving current is supplied to the semiconductor laser LD through the collector of the transistor TR 3. Here a Zener diode 18 and a resistor R 4 constitute a constant voltage circuit, which gives the base of the transistor TR 1 a predetermined bias together with resistors R 3 and R 5. In this way, unless the pulse signal 12 is applied to the transistor TR 1 through the capacitor C 2, the differential output device consisting of the transistors TR 2 and TR 3 outputs a current pulse of constant level. The differentiation circuit 13 applies increments of the pulse signal 12 (rising and decaying edge portions), i.e. a differential signal 17 to the base of the transistor TR 1 so that the collector current of the transistor TR 1 is varied. Further the rising and the decaying edge portions of the pulse signal applied to the base of the transistor TR 3 are in accordance with the rising and the decaying edge portions of the differential signal 17 applied to the base of the transistor TR 3, respectively. In this way, when the transistor TR 3 is turned on to the on-state, the front end portion of the current pulse I (LD) supplied to the semiconductor laser LD is increased by an amount corresponding to the rising edge portion of the differential signal 17 described above and thus the semiconductor laser LD emits light having a power, which is higher correspondingly. On the other hand, since it is when the transistor TR 3 is in the off-state that the decaying edge portion of the differential signal 17 is supplied to the base of the transistor TR 1, it has no influences on the emission intensity of the semiconductor laser LD. By means of such a laser driving circuit 19 it is possible to increase the light energy at the front end portion of the laser light pulse, with which the recording medium is irradiated, depending on the interval from the directly preceding laser light pulse.

Figure 7:
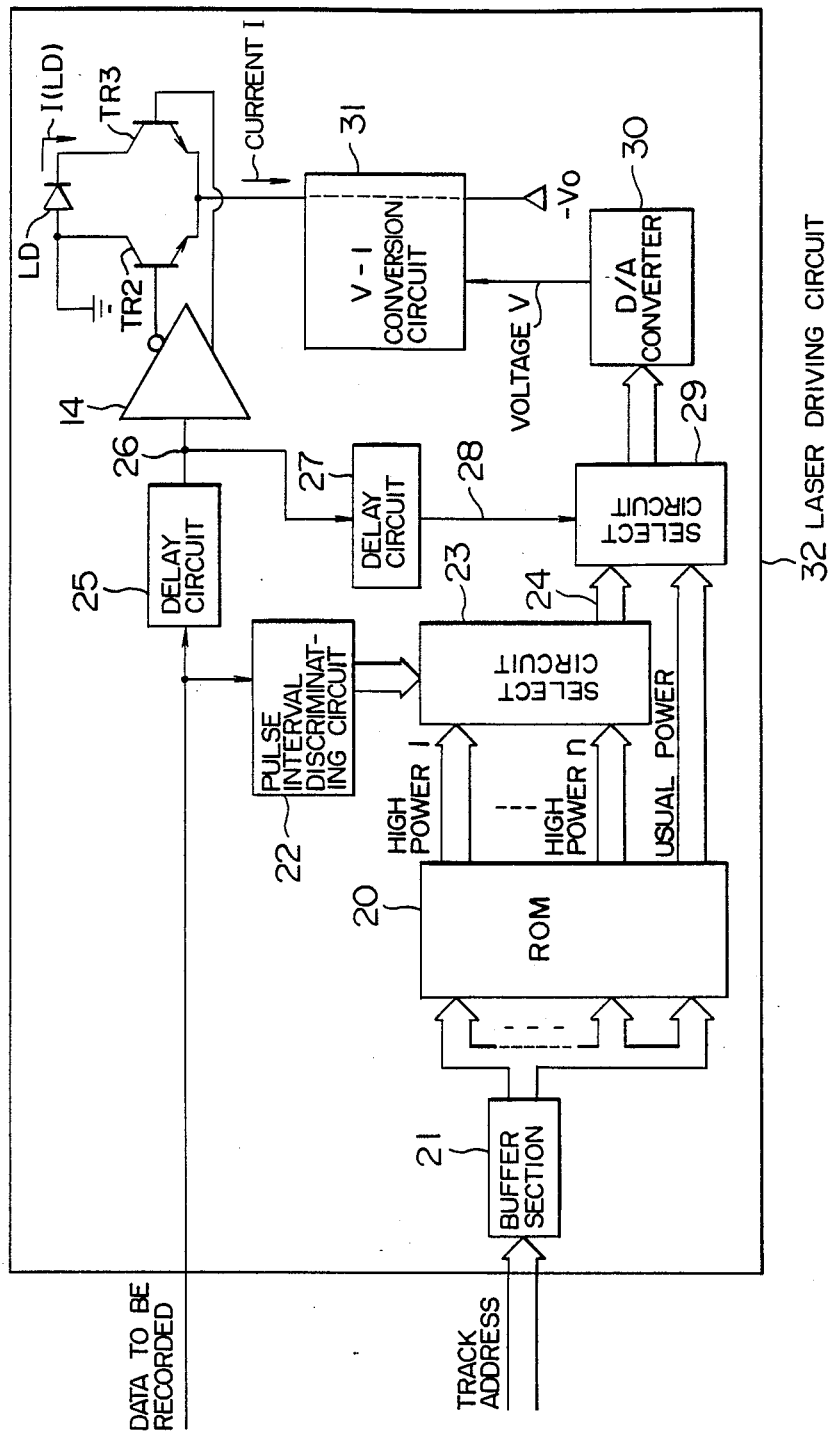
FIG. 7 is a block diagram illustrating another embodiment of the laser driving circuit in an optical information recording apparatus according to this invention.
Figure 8:
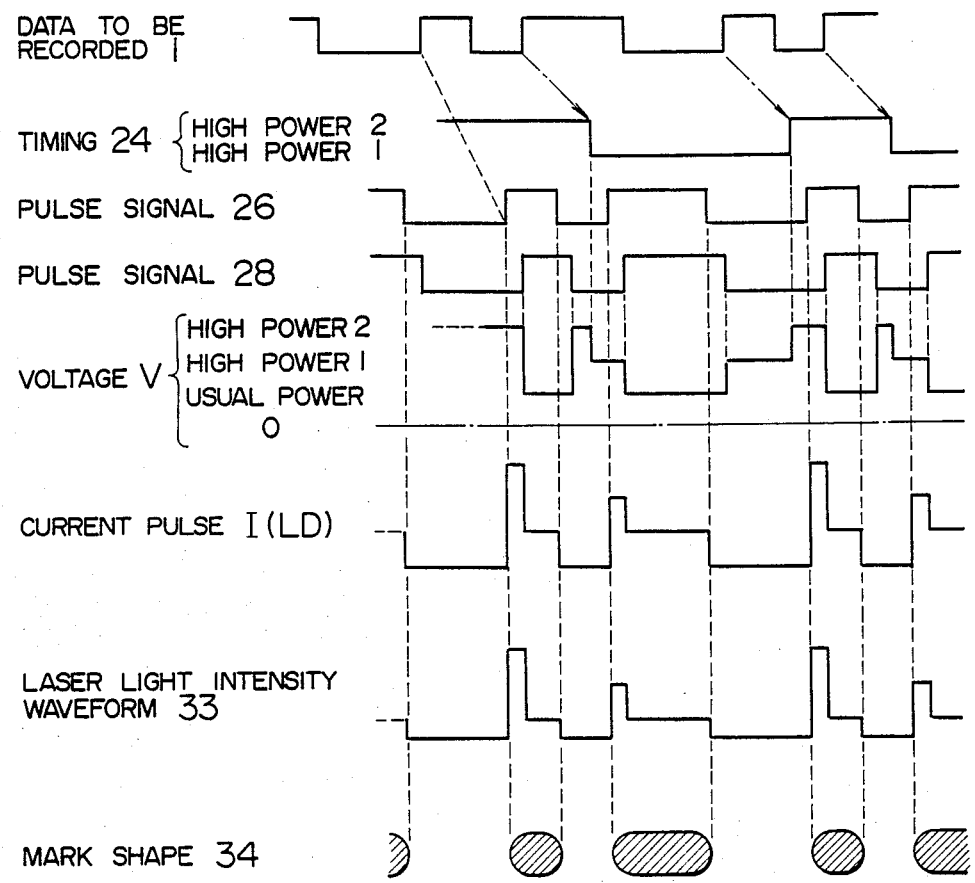
FIG. 8 shows the working waveform for the circuit of the embodiment indicated in FIG. 7.

FIG. 7 is a block diagram illustrating another embodiment of this invention. FIG. 8 shows the working waveform for various parts in the circuit indicated in FIG. 7. Setting values of the laser light intensity corresponding to the recording conditions are written previously in an ROM 20. Such laser light intensities include, besides a usual recording laser light intensity (usually in power), laser light intensities (high powers 1 to n) at the front end portion, which should be increased, depending on the interval from the directly preceding laser light pulse. For the sake of simplicity, the case of n=2 is indicated in FIG. 8. A buffer section 21 accesses data stored in the ROM 20, corresponding to the address of a track to be recorded. Further the data to be recorded 1 are successively discriminated by a pulse interval discriminating circuit 22. As a result, a select circuit 23 selects one of the data (high powers 1 to n) stored in the ROM 20 and outputs one of high power data with a timing indicated in FIG. 8. A delay circuit 25 generates a pulse signal 26 while delaying the data to be recorded 1, depending on the amount of the delay at pulse interval discriminating circuit 22 and the select circuit 23. Further the pulse signal 26 drives not only the differential amplifier 14 but also another select circuit 29 in the form of a pulse signal 28, which is slightly delayed by a delay circuit 27 so as to switch over the high powers and the usual power. The output of the select circuit 29 is transformed into a voltage V by a D/A converter 30 and transformed further into a current I by a V−I converter circuit 31. On the other hand the differential amplifier 14 supplies two differential signals having polarities opposite to each other to transistors TR 2 and TR 3, respectively, constituting a differential output device, depending on the pulse signal 26 inputted through a delay circuit 25. The V−I converter circuit 31 is connected with the emitters of the transistors TR 2 and TR 3 and controls the sum of the currents flowing therethrough. The semiconductor laser LD is fed with driving current through the collector of the transistor TR 3. When the transistor TR 3 is in the on-state and the sum I of the currents is varied, the collector current of the transistor TR 3 varies. As indicated in FIG. 8, just before the transistor TR 3 is turned on to the on-state, the sum I of the currents becomes the value at the high power and during the time the transistor TR 3 is in the on-state, it is changed to the value at the usual power. As a result, the current pulse I (LD) supplied to the semiconductor laser LD is shaped, as indicated in FIG. 8, and the emission intensity of the semiconductor laser LD varies in the similar way. It is possible to increase the light energy at the front end portion of the laser light pulse, with which the recording medium is irradiated, depending on the interval from the directly preceding laser light pulse, also by means of such a laser driving circuit 32.

FIGS. 6 and 8 show the relations between the waveform 33 of the laser light intensity in the laser driving circuits 19 and 32, respectively, described above and the shape of the mark 34. Even if the interval between laser light pulses is shortened at the recording, the increment of the temperature due to the thermal diffusion from the directly preceding recorded mark is canceled by limiting the increment of the laser light intensity at the front end portion of the laser light pulse. That is, independently of the pattern of the data to be recorded, it is possible to effect recording without jitter. This invention is efficient in particular for recording medium having a high heat conductivity, such as opto-magnetic recording medium, etc.

Figure 9:
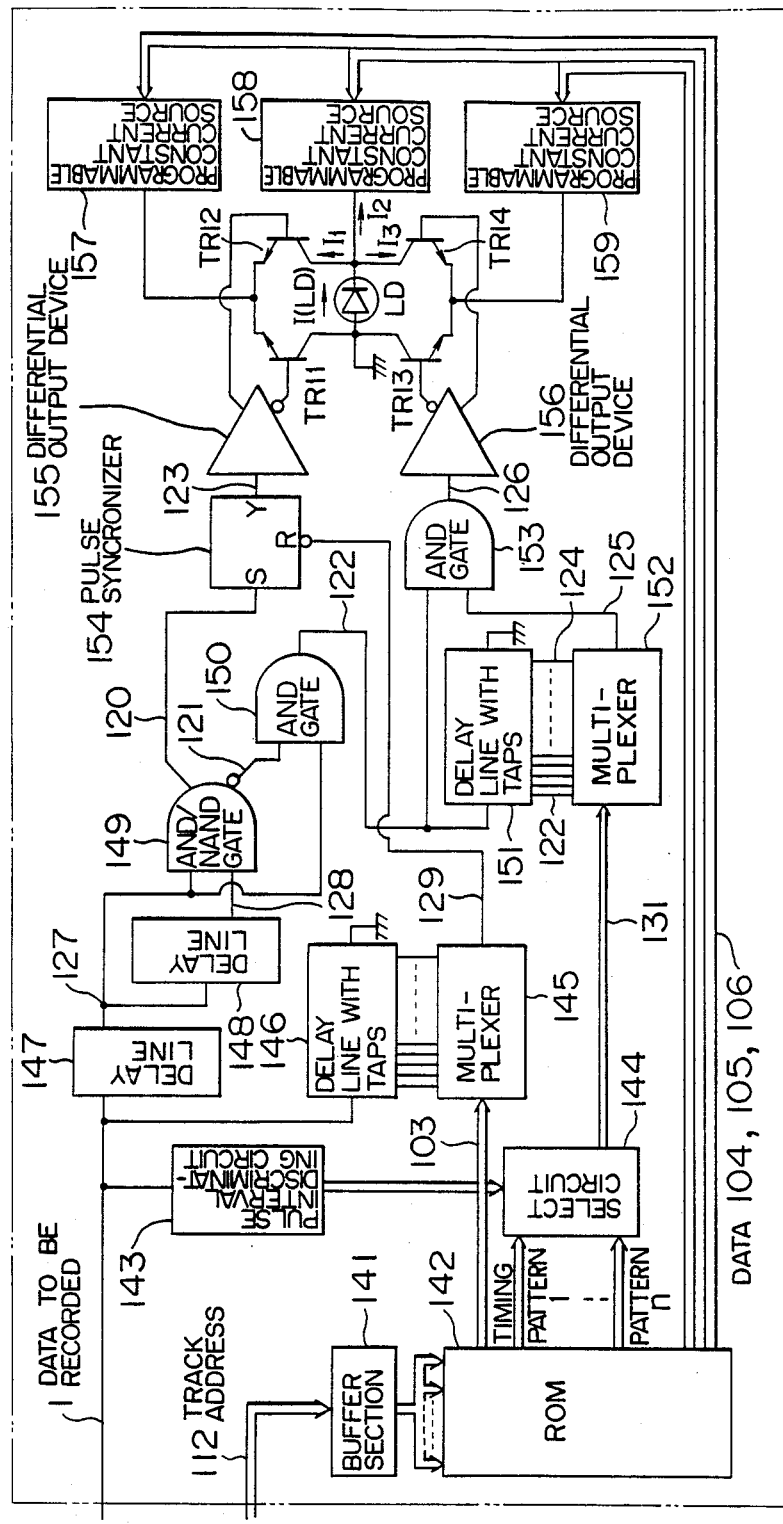
FIG. 9 is a block diagram illustrating still another embodiment of the laser driving circuit in an optical information recording apparatus according to this invention.
Figure 10:
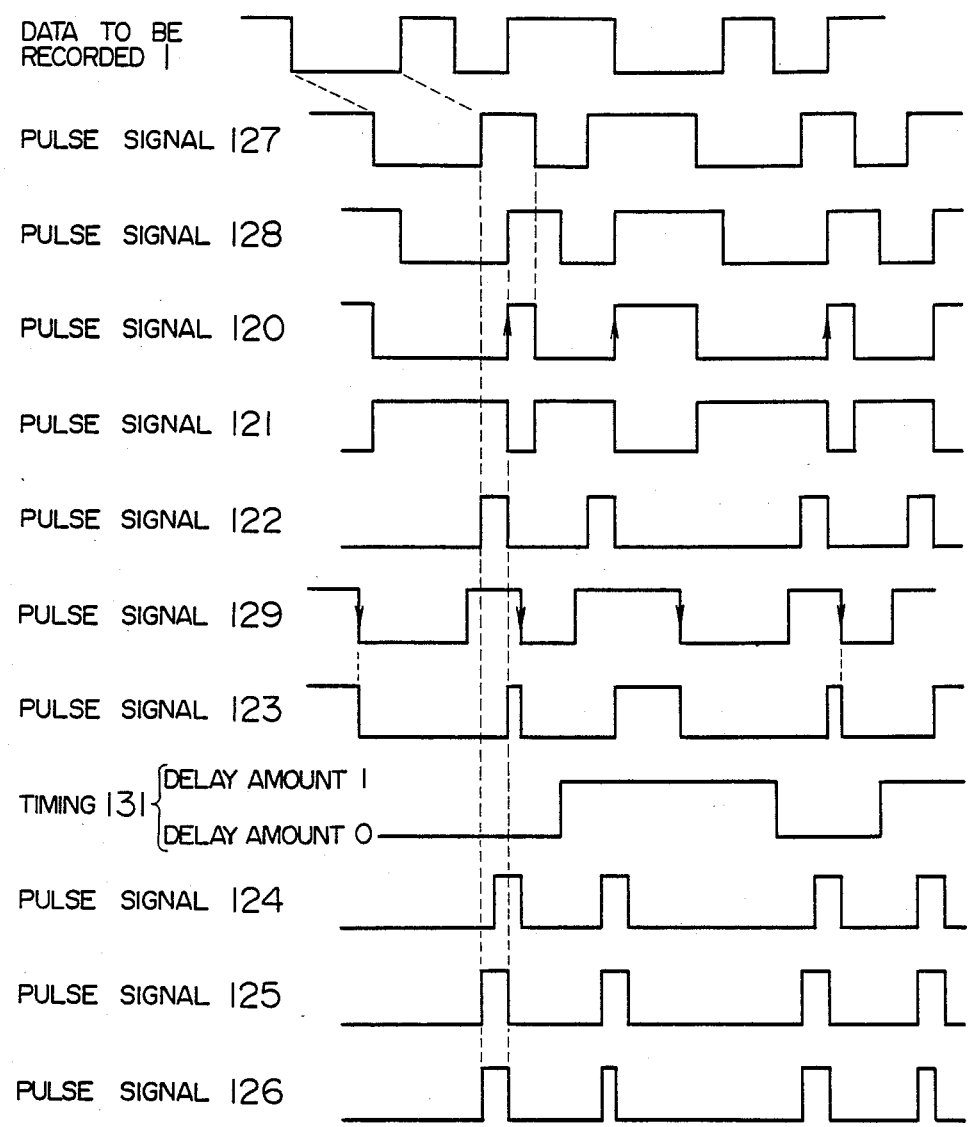
FIG. 10 shows the working waveform for the circuit of the embodiment indicated in FIG. 9.
Figure 11:
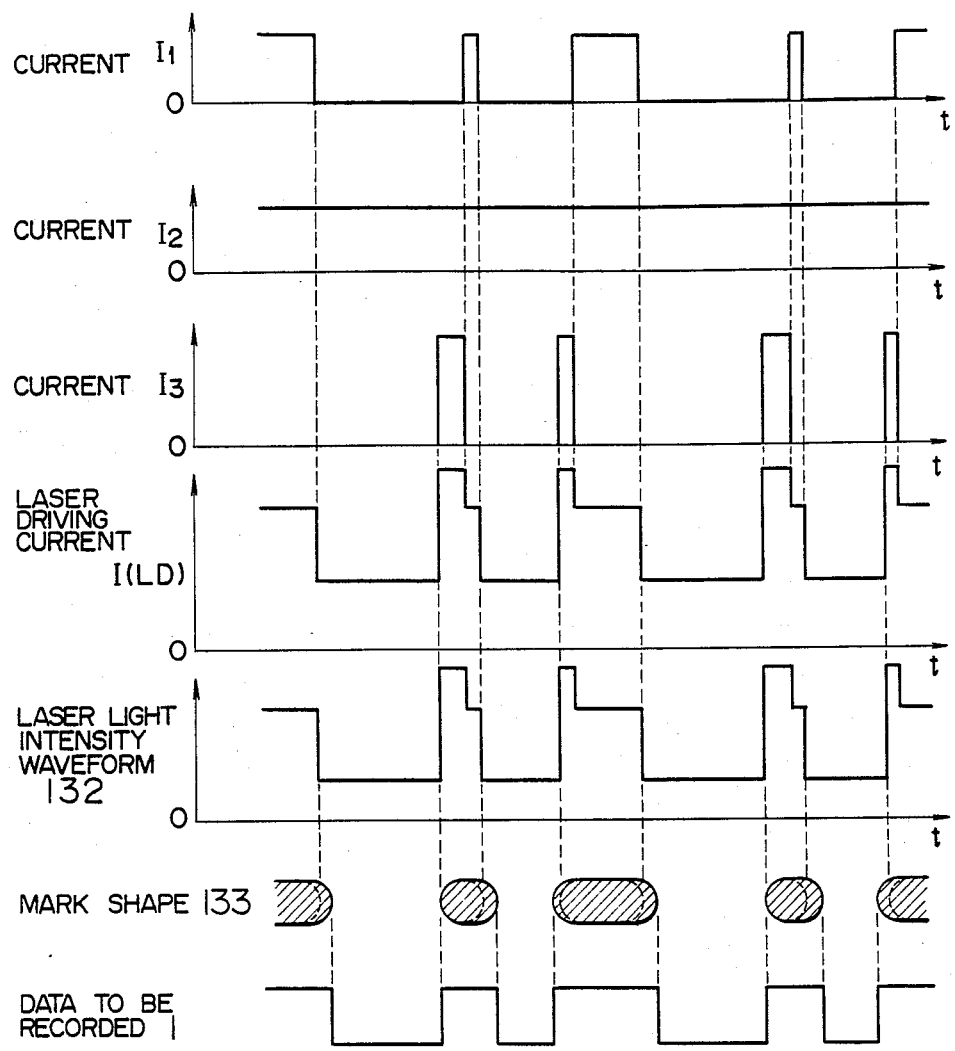
FIG. 11 shows the working waveform related to FIG. 10.
Figure 12:
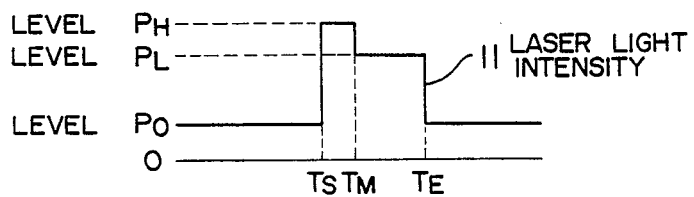
FIG. 12 shows the waveform of the recording laser light intensity according to this invention.

FIG. 9 is a scheme illustrating still another embodiment of this invention. FIGS. 10 and 11 indicate signal waveforms and so forth in various parts of the circuit indicated in FIG. 9. Setting values such as the laser light intensity 111 (DC level $P_O$, level $P_H$ at the front end portion of the laser light pulse, level $P_L$ at the rear end portion of the laser light pulse), the starting timing $T_S$ of the irradiation with the laser light pulse (patterns 1 to n), the variation timing $T_M$ of the laser light intensity and the termination timing $T_E$ of the irradiation are written previously in an ROM 142, depending on irradiation conditions such as the scanning speed with the laser light beam. A buffer section 141 accesses data stored in an ROM 142, corresponding to the address of the track to be recorded 112.

The current values of programmable constant current sources 157 to 159 are set by data 104 to 106 of the laser light intensity 111 (DC level $P_O$, level $P_H$ at the front end portion of the laser light pulse, level $P_L$ at the rear end portion of the laser light pulse) accessed by the buffer section 141. The programmable constant current source 158 feeds the laser diode LD with a current I 2 set so that the temperature of the recording medium just before the laser light pulse irradiation is kept constant, independently of the scanning speed of the laser light beam. The method, by which the current I 2 is set, will be described below. That is, for this purpose, it may be sufficient to measure the recording threshold value of the DC laser light intensity for every scanning speed and to set the laser light driving current value capable of generating laser light having an intensity obtained by reducing this recording threshold value with a predetermined ratio as the current I 2. By this method it is possible to maintain the temperature of the recording medium just before the laser light pulse irradiation constant, independently of the scanning speed of the laser light beam. In this case it may be sufficient to set the current I 2 to the emission threshold current value for the laser diode LD, independently of the scanning speed with the laser light beam. Further, if the automatic focusing or tracking is effected with a laser light beam other than the laser light beam for recording, it can be tried to stabilize the servo control, independently of the pattern of the data to be recorded 1. Further the programmable constant current sources 157 and 159 supply currents I 1 and I 3, respectively, set so that the width of the mark 2 formed by the laser light pulse irradiation in the direction perpendicular to the track is kept constant, independently of the position of the mark 2 and the sweeping speed of the laser light beam. The setting of the currents I 1 and I 3 may be realized by the procedure that (A) the current I 1 is so determined that the reproduced signal amplitude at the second half of the mark recorded by a sufficiently long laser light pulse has a predetermined level and (B) the timing $T_M$ and the current I 3 are so set that the first and the second halves of the reproduced signal waveform of the recorded mark are symmetric with respect to the center line. Here, in the case where the temperature of the recording medium just before the laser light pulse irradiation is kept constant, if the timing $T_M$ is maintained constant, since the value of the ratio I 1:I 3 keeping the widths of the first and the second halves of the mark constant has an approximately constant value, even if the scanning speed with the laser light beam varies, it is not necessary to set independently the current I 1 and I 3. For this reason it is easy to set the laser light intensity 111 at the recording.

FIG. 10 shows the working waveform for the circuit of the embodiment indicated in FIG. 9 for n=2 for the sake of simplicity (n represents the kind of patterns of the interval of the pulses to be recorded). A delay line 147 delays the data to be recorded 1, depending on the amount of the delay in the pulse interval discriminating circuit 143, so as to form a pulse signal 127. Further the pulse signal 127 drives an AND/NAND gate 149 together with a pulse signal 128 delayed slightly by a delay line 148 and produces a pulse signal 120 corresponding to the second half of each of the series of pulses of the data to be recorded 1 and a pulse signal 121 obtained by inverting it. Further it is also possible to obtain a pulse signal 122 corresponding to the first half of each of the series of pulses of the data to be recorded 1 by inputting the pulse signal 121 and the pulse signal 127 in an AND gate 150. In addition, the data to be recorded 1 are successively discriminated by a pulse interval discriminating circuit 143. Dependent on the result thus obtained, a select circuit 144 selects one of the data (timings 1 to n) in an ROM 142, and drives a multiplexer 152 with a timing 131 so as to switch over the taps of a delay line 151 with taps. The pulse signal 122 is inputted in the delay line 151 with taps, generates the pulse signal 122 itself as an output of the tap without delay and a pulse signal 124 as an output of a tap with delay. The multiplexer 152 switches over the pulse signal 122 and the pulse signal 124 with a timing 131 so as to output a pulse signal 125. By inputting the pulse signal 125 and the pulse signal 122 in an AND gate 153 it is possible to obtain a pulse signal 126 in the form obtained by displacing the first half of each of the series of pulses of the data to be recorded with the timing $T_S$.

On the other hand, data 103 in the ROM 142 accessed, responding to the track address 112, represent the setting value for the termination timing $T_E$ of the irradiation with the recording laser light pulse, depending on the scanning speed with the laser light beam and switch over the amounts of delay of a delay line with taps 146 by driving a multiplexer 145. The data to be recorded 1 is delayed by a predetermined amount by the multiplexer 145 and the delay line with taps 146 and produce a pulse signal 129. The pulse signal 129 and the pulse signal 120 drive a pulse synchronizer 154, which gives rise to a pulse signal 123. The pulse synchronizer 154 is a logic gate, which begins to output a pulse at its Y output in synchronism with the rise of the S (set) input and finishes the pulse output in synchronism with the fall of the R (reset) input. As a result of the operation described above the pulse signal 123 has a form corrected in the pulse width at the second half of each of the series of pulses of the data to be recorded 1 so that a predetermined mark length can be obtained, independently of the scanning speed of the laser light beam. Here the setting of the correction value in the pulse width is effected by advancing or retarding the timing $T_E$ so that the full width at half height of the reproduced signal for the recorded mark 2 and the width of the recorded pulse are in accordance with each other, after having set the recording laser light intensity by the method described above, depending on the scanning speed of the laser light beam. Further a current switch constituted by a differential output device 155 and transistors TR 11 and TR 12 and a current switch constituted by a differential output device 156 and transistors TR 13 and TR 14 switch over programmable constant current sources 157 and 159, respectively, depending on the pulse signals 123 and 126. As a result of the operation described above the laser diode LD is fed with a laser driving current I (LD) obtained by synthesizing the currents I 1 to I 3, as indicated in FIG. 11.

Furthermore the method, according to which the starting timing $T_S$ of the irradiation with the laser light pulse corresponding to the interval between recorded pulses is as follows. At the state where the recording conditions except for the correction for the timing $T_S$, i.e. the levels $P_O$, $P_H$, $P_L$ of the laser light intensity 111 and the timings $T_M$ and $T_E$ have been set, high precision recording is possible, only when the spacing between marks is great. When data to be recorded having a small spacing between marks are recorded/reproduced, the full width at half height varies. The starting timing $T_S$ of the irradiation with the laser light pulse may be set so as to cancel this variation. By using such a laser driving circuit 300 it is possible to maintain the temperature of the recording medium just before the irradiation with the recording laser light pulse and at the same time to control the starting timing $T_S$ of the irradiation with the laser light pulse, depending on the magnitude of the spacing between recorded pulses, independently of the laser light intensity variation timing $T_M$ and the irradiation termination timing $T_E$.

FIG. 11 indicates the relation between the waveform 132 of the laser light intensity and the recorded mark shape 133 in this laser driving circuit 300. Even if the interval between recorded pulses is shortened, influences of the temperature rise due to the heat conduction from the mark 2, which has been recorded directly before, are canceled only by retarding the starting timing $T_S$ of the irradiation with the laser light pulse. That is, it is possible to effect recording without jitter, independently of the pattern of the data to be recorded 1. Further it is easy to set the laser light intensity 111 (the level $P_H$ at the front end portion of the laser light pulse and the level $P_L$ at the rear end portion of the laser light pulse) at the recording, owing to the fact that the laser light intensity 111 at the pulse off (DC level $P_O$) is so set that the temperature of the recording medium just before the irradiation with the laser light pulse is kept constant, independently of the scanning speed of the laser light beam. In addition, since the laser light intensity 111 (the level $P_H$ at the front end portion of the laser light pulse and the level $P_L$ at the rear end portion of the laser light pulse) at the recording is so set that the width of the recorded mark 2 in the direction perpendicular to the track is maintained constant, independently of the position of the mark 2 and the scanning speed of the laser light beam, even if the scanning speed of the laser light beam varies, no displacement in the position of the front end of the mark with respect to the starting position of the irradiation with the laser light pulse on the recording medium is produced. This is very useful in the case where the absolute position of the mark 2 on the recording medium is concerned, such as at the use of sampled clocking. Furthermore, when the scanning speed of the laser light beam varies, it is possible to control the position of the trailing edge of the mark 2 independently of the position of the leading edge by controlling uniformly only the termination timing $T_E$ of the irradiation with the recording laser light pulse for every pulse. In addition, when the laser light intensity 111 is increased or decreased depending on the scanning speed of the laser light beam, it can be intended to stabilize the servo by controlling the automatic focusing system for the laser light beam or the servo loop gain for the tracking system. The laser driving circuit 300 is suitable also for the automatic control, etc., because each of the recording conditions can be set independently owing to the fact that the width of the recorded mark 2 is controlled by the laser light intensity 111, that the length of the mark 2 is controlled by the timing $T_E$ and that the influences of the heat conduction from the directly preceding mark 2 are canceled by controlling the timing $T_S$. That is, at first a mark 2 formed by a test recording is reproduced and the laser light intensity 111 is set, depending on the amplitude of the reproduced signal corresponding to the width of the mark 2. Then the termination timing $T_E$ of the irradiation with the laser light beam is set, depending on the full width at half height of the reproduced signal of marks 2, which are sufficiently distant from each other. Further the starting timing $T_S$ of the irradiation with the laser light beam is set, depending on the full width at half height of the reproduced signal of marks 2, which are sufficiently close to each other. In this way it is possible to set automatically the recording conditions in the case where recording is effected with a certain scanning speed on a certain recording medium.

As explained above, according to this invention, an optical information recording apparatus can be realized, which is capable of forming domains having a good shape and recording information with a high density and high precision without recording jitter due to patterns to be recorded.

We claim:
1. An optical information recording apparatus, in which binary information is recorded by irradiating recording medium with laser light pulses corresponding to pulses to be recorded so as to vary locally characteristics of the recording medium by thermal energy of the laser light pulses, comprising:
   means for setting the light energy at the front and the rear end portions of said laser light pulse;
   means for discriminating the interval between said pulses to be recorded; and
   means for giving said means for setting the light energy a control signal controlling energy at the front end portion of each of said laser light pulses, depending on the output of said means for discriminating the interval.
2. An optical information recording apparatus according to claim 1, wherein said means for giving a control signal includes means for supplying a control signal varying the light intensity at the front end portion of each of said laser light pulses.

3. An optical information recording apparatus according to claim 1, wherein said means for giving a control signal includes means for varying the pulse width at the front end portion by controlling the starting timing of the irradiation with said laser light pulses.

4. An optical information recording apparatus according to claim 1, further comprising means for detecting the scanning speed with said laser light pulses on said recording medium.

5. An optical information recording apparatus according to claim 4, further comprising means for giving said means for setting the light energy a control signal for controlling light intensity when the recording medium is not irradiated with said laser light pulses, depending on the scanning speed detected by said means for detecting the scanning speed.

6. An optical information recording apparatus according to claim 4, further comprising means for giving said means for setting the light energy control signals for controlling the laser light intensities at the front and the rear end portions of each of said laser light pulses, depending on said scanning speed.

7. An optical information recording apparatus according to claim 4, further comprising means for giving said means for setting the light energy control signals for controlling the termination timing of the irradiation with said laser light pulses, depending on said scanning speed.

8. An optical information recording apparatus, in which information is recorded by irradiating a surface of recording medium with a focused laser light beam and altering characteristics of the surface of said recording medium by thermal energy of the laser light beam, comprising:
means for recording information with a laser light having an intensity, which is higher at the front end portion than at the rear end portion of each of laser light pulses, with which said recording medium is irradiated for the recording;
means for discriminating the interval between said pulses to be recorded; and
means for controlling the laser light intensity at the front end portion of said laser light pulses, depending on the magnitude of the interval between said laser light pulses.

9. An optical information recording apparatus, comprising:
means for outputting a laser light pulse, whose intensity is higher at the front end portion than at the rear end portion, corresponding to pulses to be recorded;
means for detecting the interval between said pulses to be recorded; and
means for giving said means for outputting the laser light pulse a first control signal controlling at least one of the starting timing of the irradiation with said laser light pulse and the intensity at the front end portion so as to vary the energy at said front end portion;
whereby binary information is recorded by varying locally characteristics of the recording medium by thermal energy of said laser light pulses.

10. An optical information recording apparatus according to claim 9, further comprising means for detecting the scanning speed of said laser light pulses on said recording medium.

11. An optical information recording apparatus according to claim 10, further comprising means for giving said means for outputting a laser light pulse a second control signal for controlling light intensity when the recording medium is not irradiated with said laser light pulses, depending on the scanning speed detected by said means for detecting the scanning speed.

12. An optical information recording apparatus according to claim 10, further comprising means for giving said means for outputting a laser light pulse a third and a fourth control signals for controlling the laser light intensities at the front and the rear end portions, respectively, of said laser light pulses, depending on said scanning speed.

13. An optical information recording apparatus according to claim 10, further comprising means, for giving said means for outputting a laser light pulse a fifth control signal for controlling the termination timing of the irradiation with said laser light pulses, depending on said scanning speed.

14. An optical information recording apparatus according to claim 9, wherein said means for outputting a laser light pulse includes a semiconductor laser; means for outputting recording currents corresponding to the front end portion and the rear end portion, respectively, of said laser light pulses; and means for feeding said semiconductor laser with said recording currents.

15. An optical information recording apparatus, in which information is recorded by irradiating a surface of recording medium with a focused laser light beam and altering characteristics the surface of said recording medium by thermal energy of the laser light beam, comprising:
means for recording information while setting a laser light intensity at the front end portion independently of that at the rear end portion of each of laser light pulses with which said recording medium is irradiated, corresponding to recording pulses;
means for detecting the scanning speed of said laser light beam on said recording medium;
means for controlling laser light intensities at the front and the rear end portions of said laser light pulses and the duration of the irradiation, depending on said scanning speed;
means for discriminating the interval between said pulses to be recorded; and
means for controlling the starting timing of said laser light pulses, depending on the magnitude of the interval between said laser light pulses.

* * * * *